United States Patent [19]
Smalley

[11] Patent Number: 5,600,227
[45] Date of Patent: Feb. 4, 1997

[54] ELECTRICAL STORAGE BATTERY CHARGER AND CONDITIONER

[76] Inventor: Gustav C. Smalley, 900 Knopf St., Manville, N.J. 08835

[21] Appl. No.: 282,966

[22] Filed: Jul. 29, 1994

[51] Int. Cl.⁶ .......................... H01M 10/44; H01M 10/46
[52] U.S. Cl. .................... 320/21; 320/35; 320/39
[58] Field of Search .............................. 320/5, 9, 13, 20, 320/21, 22, 14, 35, 36, 39, 40

[56] References Cited

U.S. PATENT DOCUMENTS

| | | | |
|---|---|---|---|
| 3,559,025 | 1/1971 | Burkett et al. | 320/14 |
| 3,609,502 | 9/1971 | Burkett | 320/5 |
| 3,614,583 | 10/1971 | Burkett | 320/5 |
| 3,614,584 | 10/1971 | Burkett | 320/5 |
| 4,260,943 | 4/1981 | Zaderej et al. | 320/21 |
| 4,641,078 | 2/1987 | Short | 320/21 |
| 4,728,877 | 3/1988 | Adamson | 320/21 |
| 4,740,739 | 4/1988 | Quammem et al. | 320/14 |
| 4,829,225 | 5/1989 | Podrazhansky et al. | 320/14 |
| 4,897,591 | 1/1990 | Spani | 320/22 |
| 5,043,650 | 8/1991 | Bhagwat et al. | 320/36 X |

*Primary Examiner*—Edward H. Tso
*Attorney, Agent, or Firm*—Ice Miller Donadio & Ryan

[57] ABSTRACT

The present invention provides a charging, discharging and conditioning method and apparatus that provides an improved method of breaking in new rechargeable batteries and reconditioning old batteries. Batteries are charged according to the method of the present invention by applying a high frequency charging current to the batteries. The charging current is then removed once the batteries are substantially charged. The resulting charged batteries are thereafter rapidly discharged, using a high discharge current switched on and off at a high frequency. The resulting discharged batteries may then be charged by conventional techniques. A novel battery charger for use in the above described method includes a high frequency switch operably connected in the circuit path of a battery charging socket and a dc power supply. The high frequency switch is preferably driven by a high frequency, substantially rectangular wave signal.

18 Claims, 3 Drawing Sheets

ELECTRICAL STORAGE BATTERY CHARGER AND CONDITIONER

FIELD OF THE INVENTION

The present invention relates to the field of rechargeable electrical storage batteries, and more particularly, methods and apparatus for conditioning and charging such batteries.

BACKGROUND OF THE INVENTION

Rechargeable batteries, for example, nickel cadmium batteries, provide a renewable source of power for the increasing number of portable consumer and commercial electronic appliances. A problem related to the use of nickel cadmium (Nicad) batteries or cells is that newly manufactured cells are known to provide less than optimal performance than those cells which have been through a number of charge/discharge cycles.

Performance is measured by the number of ampere-hours one or more cells can provide at or above a useful output voltage. Thus, performance is not only a measure of the amount of energy that a cell delivers, but the manner in which the energy is delivered. A cell is more useful if it provides most of its energy at or above a useful threshold voltage instead of over a wide range of voltages. For example, a 1.2 volt cell that dissipates half of its stored energy at voltage levels below 0.8 volts is considered inefficient.

It is known that after several charge/discharge cycles, a Nicad cell will provide a better, in other words, a more square, voltage-time discharge curve. It has been found empirically that as many as 20 charge/discharge cycles may be required to obtain optimal performance. A consumer relying on such cells experiences inconvenience because of the shorter useful discharge time associated with newer cells.

One solution to the above described problem is to condition new cells by running the cells through approximately 20 charge/discharge cycles prior to their first use. This solution, however, is extremely wasteful with respect to time and energy.

Another disadvantage of Nicad batteries is that after a substantial number of charges, the ability of the battery to receive a satisfactory charge is inhibited. In U.S. Pat. No. 4,829,225, it is explained that this is due in part to the progressive accumulation of positive ions to the negative plate and negative ions to the positive plate. The accumulation of ions blocks further ions from reaching the plates, inhibiting charging. U.S. Pat. No. 4,829,225 ('225) further teaches that by charging the battery with a periodic signal that includes a short discharge cycle, the plates, and therefore the battery, may be reconditioned, thereby enabling the battery to receive a satisfactory charge. The periodic charging signal taught in '225 uses a periodic pulse of as high as 10 Hz, but preferably less than 2 Hz. In the embodiment disclosed therein, one pulse consists of 0.712 secs. and includes a 2 msec discharge pulse and a 10 msec stabilization period.

SUMMARY OF THE INVENTION

The present invention provides a charging, discharging and conditioning method and apparatus that includes an improved method of breaking in new rechargeable batteries and reconditioning old batteries. Batteries conditioned by the method of the present invention provide more ampere-hours of operation above a useful threshold voltage than unused, unconditioned batteries.

According to a method of the present invention, batteries are charged by applying a high frequency charging current to the batteries. The charging current is then removed once the batteries are substantially charged. The resulting charged batteries are thereafter rapidly discharged, using a high discharge current switched on and off at a high frequency. The resulting discharged batteries may then be charged by conventional means.

A novel battery charger that may be used in the above described method or to otherwise condition batteries according to the present invention includes a high frequency switch operably connected in the circuit path between a battery charging socket and a dc power supply. The high frequency switch is preferably driven by a high frequency, substantially rectangular wave signal.

Other features and advantages of the present invention will be clear to those of ordinary skill in the art by reference to the drawings and detailed description below.

DETAILED DESCRIPTION OF THE DRAWINGS

Figure 1:
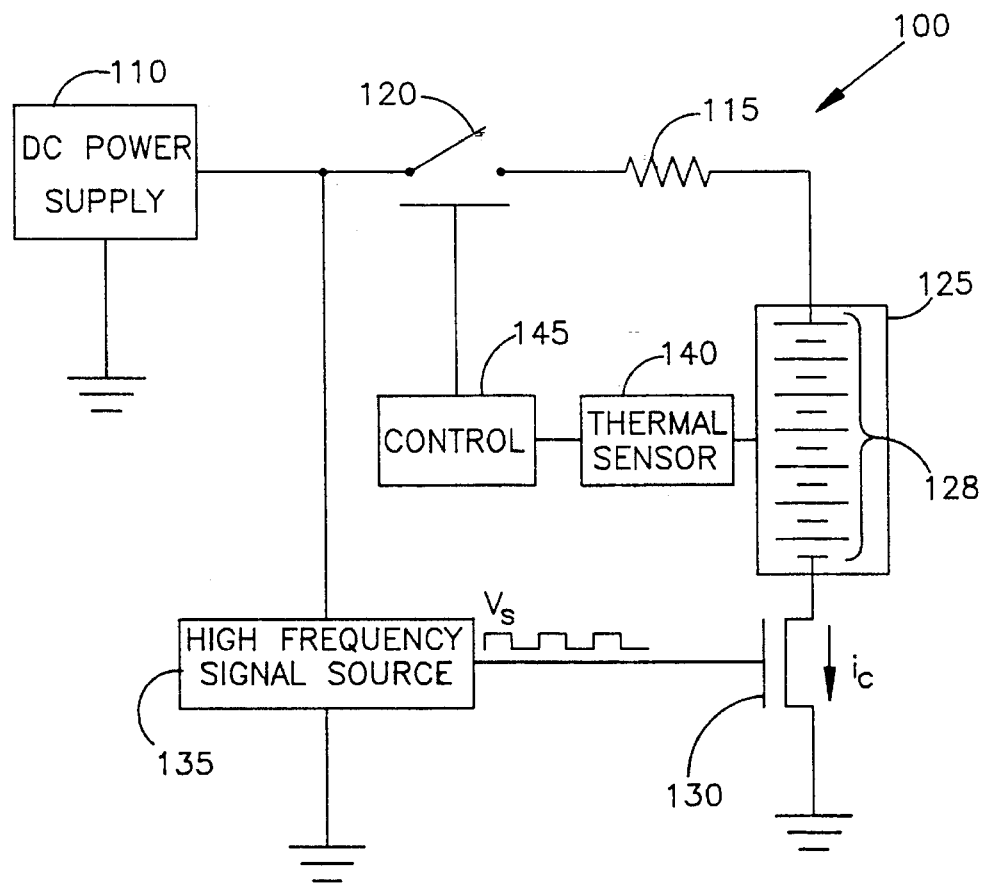
FIG. 1 illustrates an electrical storage battery charging apparatus according to the present invention.

FIG. 1 illustrates an electrical storage battery charging apparatus according to the present invention. While the details concerning the devices and functional blocks are given for an exemplary embodiment designed to operate with six Nicad batteries, the modifications necessary to adapt the circuit in FIG. 1 to accommodate any number of batteries, as well as other chargeable or secondary battery types, such as nickel metal hydride batteries, would be readily apparent to one of ordinary skill in the art.

In FIG. 1, a dc power supply 110 operable to provide approximately 16 volts and at least 10 amperes is connected to a current regulator 115 through a power cutoff switch 120. The current regulator 115 suitably comprises a 0.41 Ω high current resistor, although a more sophisticated and well-known current regulator may be employed. If less than six Nicad cells are to be charged, the current regulation resistor may be adjusted to provide the appropriate charging current level, discussed below. The power cutoff switch 120 may comprise a relay or other electromechanical switching devices.

The current regulator 115 is further connected to a socket 125 for holding the batteries 128 to be charged. The socket 125 is arranged such that the batteries 128 placed therein are series connected.

The socket 125 is also connected to ground through a high frequency power switch 130. The high frequency power switch 130 includes a control lead, which is connected to a high frequency signal source 135. In the present embodiment, the high frequency power switch 130 comprises an n-channel metal oxide semiconductor field effect transistor (FET), such as a commercially available model IRFZ40 FET from International Rectifier. The FET comprises a gate, a drain and a source. In this embodiment, the socket 125 is connected to the drain, the signal source 135 is connected to the gate, and the source is connected to ground. The high frequency signal source 135 is also connected to the dc power supply and ground in order to obtain power.

The power cutoff switch 120 is operably connected to a control circuit 145. The control circuit 145 is further connected to a thermal sensor 140, which is operably positioned in the vicinity of the socket 125 in order to sense the temperature of at least one battery placed with the socket 125. A suitable thermal sensor 140 is a model LM 35 sensor from National Semiconductor which is placed in thermal contact with one or more of the batteries 128.

The elements of the circuit shown in FIG. 1 operate in the following manner to charge one or more electrical storage batteries. The dc power supply 110 provides at its output 16 vdc. When uncharged batteries are placed within the socket 125, the power cutoff switch 120 is in a closed state, which directly connects the current regulator 115 to the dc power supply 110.

Figure 2:
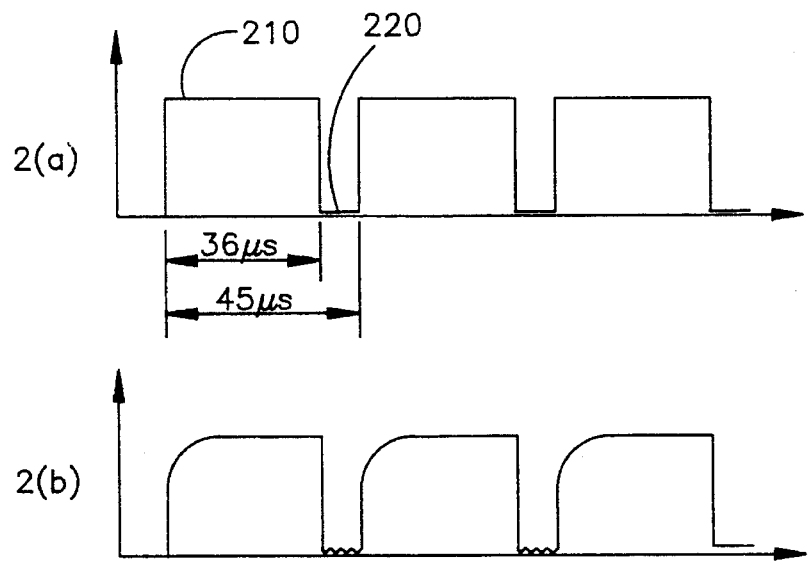
FIGS. 2 comprises 2(a) and 2(b) illustrate the voltage and current signals at various portions of the circuit illustrated in FIG. 1.

The high frequency signal source 135 provides a substantially rectangular wave high frequency signal to the high frequency power switch 130. The high frequency signal comprises a plurality of cycles, as illustrated in FIG. 2(a). Each cycle consists of two portions, an "on" portion 210 and an "off" portion 220. A duty cycle is defined herein as the fraction of a cycle during which the signal is at a particular portion, for example, "on" or "off".

During each "on" portion, the signal causes the high frequency power switch 130 to turn on. When turned on, the high frequency power switch 130 allows a positive charging current to flow through the socket 125 to ground, or in other words, back to the return loop of the dc power supply 110. As a result, the charging current created by the dc power supply 110 and the current regulator flows through the batteries placed within the socket 125, thereby charging the batteries. During the "off" portion of the high frequency signal, the high frequency power switch disconnects the socket 125 from ground, thereby opening the circuit between the socket 125 and the dc power supply 110.

FIG. 2(b) shows the waveform of the high frequency charging current $I_c$ from the circuit illustrated in FIG. 1. The current waveform comprises a plurality of cycles, each cycle alternating between a first charging current, when the high frequency power switch 130 of FIG. 1 is turned on, and a second, substantially less charging current, when the high frequency power switch 130 is turned off. The first charging current should be on the order of 10 amps in the case of sub-C Nicad batteries. Appropriate first charging current levels for batteries of other types and sizes may readily be determined by those of ordinary skill in the art. The first charging current may be adjusted by suitable selection of the current regulator 115 or adjustment of the dc power supply 110.

The second charging current level may suitably be essentially zero current, but should in any event be an order of magnitude less than the first charging current. It has been found that when the power switch 130 is turned off, $I_c$ tends to exhibit slight ripple oscillations at the low current level before settling at or near zero current. The use of low inductance wires, resistors and connections will minimize such effects.

The high frequency charging current is applied continuously, in other words, without interruption for a substantial plurality of cycles, until the batteries are substantially charged. The thermal sensor 140 and control circuit 145 operate in conjunction with the power cutoff switch 120 to detect when the batteries are charged and then automatically disconnect the charging current.

More specifically, during operation, the cutoff switch 120 is normally closed, allowing current to flow to the socket 125. The thermal sensor 140 provides a signal indicative of the temperature of one or more of the batteries 128 to the control circuit 145. When the temperature reaches a threshold, the control circuit 145 causes the cutoff switch 120 to open, thereby cutting off the current to the socket 125. The temperature threshold that indicates that batteries are fully charged varies according battery type to be charged. However, for sub-C Nicad batteries charged with the present embodiment, the threshold temperature is approximately 38° C. Although Nicad batteries reach their peak charge at 42° C., the use of a lower threshold provides an error margin for individual cell differences. In this regard, if the battery that is attached to the thermal sensor 140 exhibits a longer charge time than one or more of the other batteries, then allowing the sensed battery to reach 42° C. may create a potentially hazardous over charging situation with respect to the other batteries. According, it should be noted that a threshold of 42° C. may be utilized when charging a single sub-C Nicad battery.

Other means of detecting the charge level of one or more batteries may readily be implemented by those of ordinary skill in the art.

Figure 3:
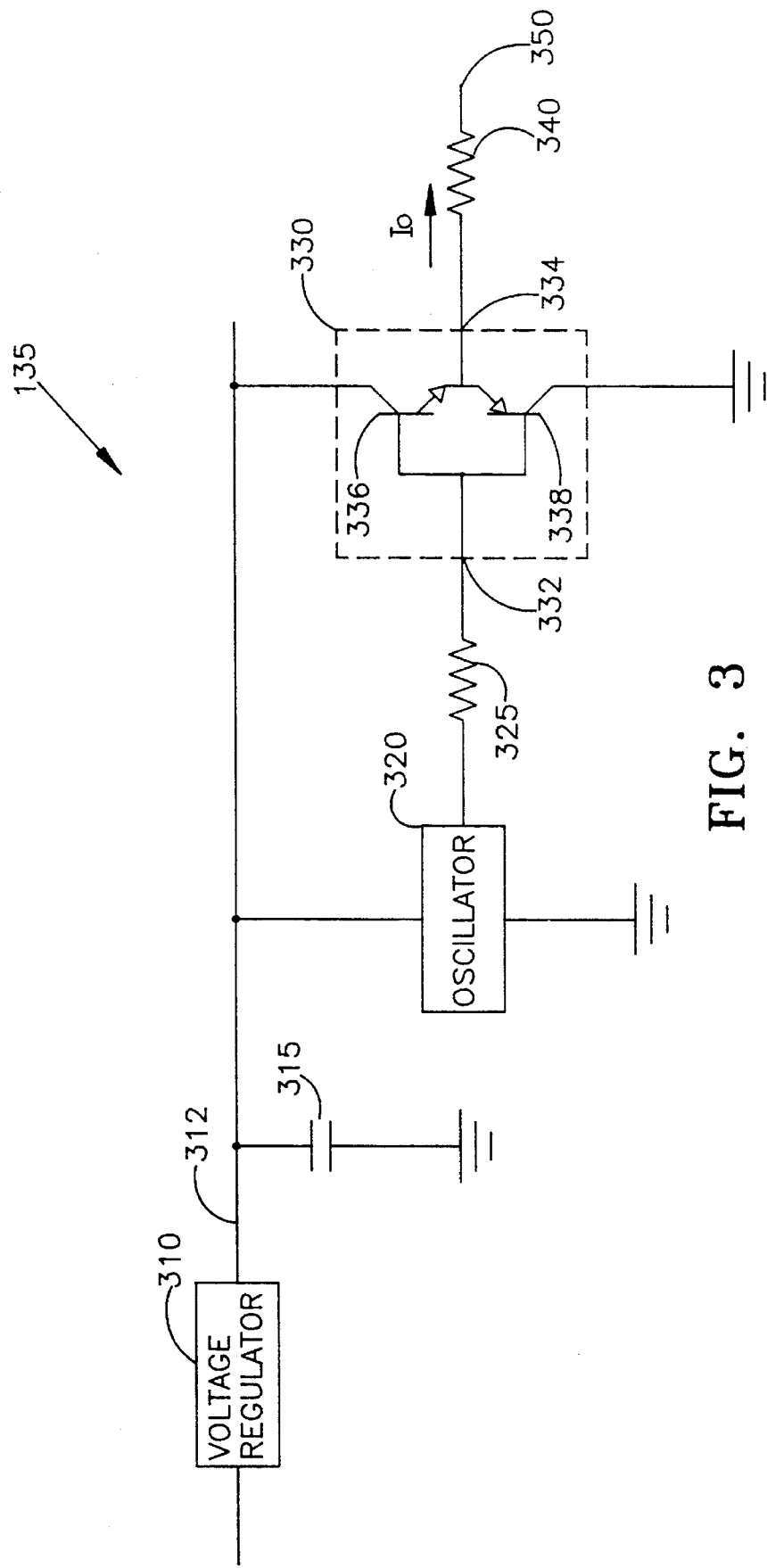
FIG. 3 illustrates a detailed circuit diagram for the high frequency signal source employed in the circuit illustrated in FIG. 1.

FIG. 3 illustrates a more detailed circuit diagram of the high frequency signal source 135 from FIG. 1. One important feature of the signal source 135 is that it provides a high frequency switching signal with sufficient current to switch rapidly the high frequency power switch 130 on and off.

A voltage regulator 310 is connected to a bias line 312. A regulation capacitor 315 is connected between the bias line 312 and ground. An oscillator circuit 320, which may suitably be a NE 555 timer/oscillator integrated circuit, is also connected between the bias line 312 and ground. The oscillator circuit has an output connected to a resistor 325.

Also connected between the bias line 312 and ground is a current driver circuit 330 including an input 332, an output 334 and two transistors 336 and 338 which are configured in a well known manner to provide a driving current. Suitable transistors 336 and 338 are medium power bipolar junction transistors such as model TIP 29 and TIP 30 transistors from Texas Instruments. The driver input 332 is connected to the resistor 325. The driver output 334 is connected to an output resistor 340. The output resistor 340 is thereafter connected to the power switch 130 from FIG. 1. Alternatively, the current driver circuit 330 from FIG. 3 may comprise a commercially available integrated circuit MOSFET driver.

The high frequency signal source 135 operates in the following manner to provide a fast rise time, high frequency, switching signal to the high frequency power switch 130. The voltage regulator 310 receives 16 vdc from the dc power supply 110 from FIG. 1. The voltage regulator 310 and the capacitor 315 are chosen to provide a constant 12 vdc voltage to the bias line 312. The voltage regulator 310 is required to ensure proper operation of the transistors 336 and 338 in the current driver 330.

The bias line 312 provides power to the oscillator circuit 320. The oscillator circuit 320 is configured in a manner well known to provide high frequency, fast rise time output signals, such as a 20 kHz to 80 kHz, substantially rectangular wave signal to the resistor 325 at its output. (See FIG.

2(a)). The oscillator output signal propagates through the resistor 325 to drive the input 332 of the current driver 330. The driver 330, which is also powered by the bias line 312, provides at its output 334 a high power driving current having a waveform similar to that of the oscillator output signal. The rectangular wave driving current then causes the switch 130 from FIG. 1 to alternately conduct and not conduct current of on the order of 10 amps. The current driver circuit 330 is required to provide sufficient current to cause the power switch 130 to turn on and off rapidly in order to achieve a charging current waveform similar to that shown in FIG. 2(b).

To condition new batteries, batteries in a discharged state should be charged by the method described above in connection with the operation of the circuit in FIG. 1. It is preferable when charging several cells to ensure that the individual cells have similar charging characteristics. In other words, the cells should take approximately the same amount of time to reach full charge. Ordinarily, battery packs used in consumer appliances comprise cells having similar charging characteristics. Likewise, cells manufactured or distributed in the same batch have sufficiently similar charging characteristics.

It should be noted that while the circuit in FIG. 1 may be employed to provide the charging step of the conditioning method of the present invention, other suitable circuits may be employed. The important features are that the charging current is switched on and off at a high frequency. It is preferable that the charging current signal comprise substantially a rectangular wave, such as that illustrated in FIG. 2(b), or other fast rise time signal.

The conditioning method of the present invention has produced positive results using switching frequencies of between 20 kHz and 80 kHz with duty cycles of less than 80% of positive charging current. The combination of the fast rise time of the rectangular wave, the high switching frequency and duty cycle create perturbations which condition the positive and negative plates of the batteries. It is plainly apparent that the exact combination of frequency value, duty cycle and wave shape may be modified to suit certain battery types or conditioning situations. Indeed, frequencies outside the experimental limits and other fast rise time wave forms may sufficiently agitate the battery plates.

In any event, once the batteries are charged and the charging current is disconnected, and the batteries are then rapidly discharged. Although any rapid discharge is adequate to complete the conditioning step, the batteries benefit further from a high frequency discharge current. Therefore, it is preferable to discharge the batteries by switchably applying a discharge load at a high frequency. This part of the conditioning step further agitates and conditions the positive and negative plates in the battery. It is further preferable to provide individual discharge paths for the batteries.

Figure 4:
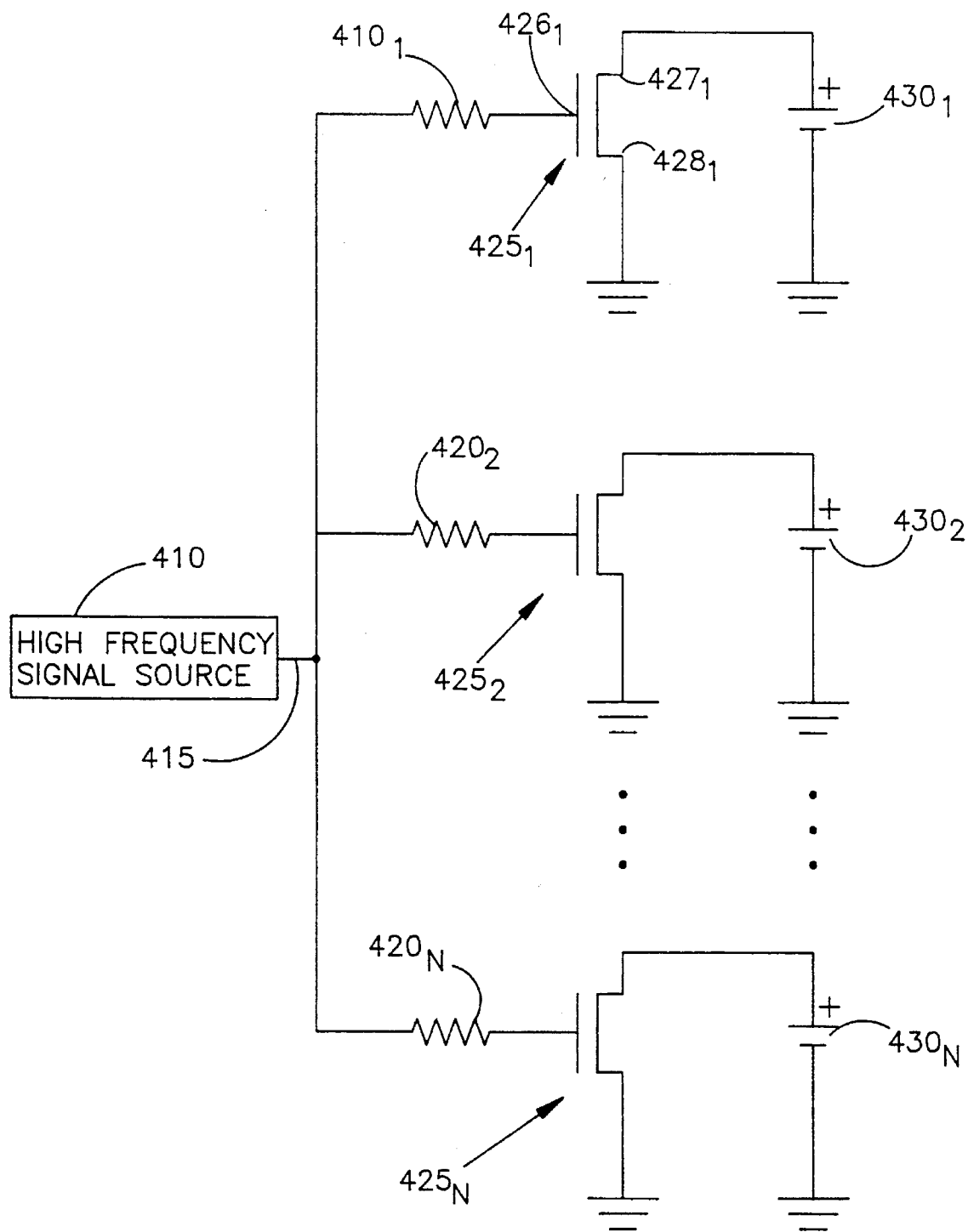
FIG. 4 illustrates an exemplary rapid discharge apparatus for use in accordance with a method of the present invention.

FIG. 4 shows a circuit for providing a high frequency discharge current to one or more batteries. In general, the circuit in FIG. 4 switchably connects a high current discharge load across a battery at a high frequency. The circuit illustrated in FIG. 4 employs such techniques to discharge a plurality of n batteries at a time, providing an individual discharge path to each of the n batteries.

A high frequency signal source 410 includes an output 415 that is connected to each of n resistors $420_1$ through $420_n$. The signal source 410 may suitably comprise the same high frequency signal source as that which is illustrated in FIG. 3, with the exception that the resistor 340 in FIG. 3 is replaced by each of the resistors $420_1$ through $420_n$ in FIG. 4. Such a signal source could be used to discharge up to 8 cells simultaneously.

The resistor $420_1$ is further connected to an FET $425_1$ having a gate $426_1$, a drain $427_1$, and a source $428_1$. The resistor $420_1$ is directly connected to the gate $426_1$. The remaining resistors $420_2$ through $420_n$ are similarly connected to similar FETs $425_2$ through $425_n$. The drain $427_1$ of the FET $425_1$ is connected to the positive terminal of a battery $430_1$ to be discharged. The source $428_1$ of the FET $425_1$ is connected to ground, as is the negative terminal of the battery $430_1$. FETs $425_2$ through $425_n$ and the batteries $430_2$ through $430_n$ are each connected in a similar manner. Each of the FETs $425_1$ through $425_n$ may suitably be a n-channel channel MOSFET. In such a case, each of the resistors $420_1$ through $420_n$ may suitably be a 10Ω resistor.

In operation, the high frequency signal source 410 provides at its output a fast rise time, high frequency signal, such as, for example, a 20 kHz to 80 kHz substantially rectangular wave signal waveform. (See FIG. 2(a)). The signal alternates between a high logic voltage and a low logic voltage, and preferably exhibits a less than 80% high logic voltage duty cycle.

When the signal is at the high logic voltage, a driving current flows through the resistor $420_1$ to charge the gate $426_1$ of the FET $425_1$. As a result, the FET $425_1$ conducts current from drain $427_1$ to source $428_1$, which produces a low resistance, high current discharge impedance for the battery $430_1$. For example, if an n-channel MOSFET is employed, the FET $425_1$ provides on the order of $10^{-1}$ ohms of resistance when fully turned on through application of the voltage and driving current to the gate $426_1$. When the signal is at the low logic voltage, the gate $426_1$ discharges, and the FET $425_1$ no longer conducts current from drain $427_1$ to source $428_1$. The other resistors $420_2$ through $420_n$ and FETs $425_2$ through $425_n$ operate in a similar manner to discharge the batteries $430_2$ through $430_n$. Thus, the discharging circuit in FIG. 4 provides a high frequency discharge current to the cells. The high frequency discharge current waveform comprises a plurality of cycles, each cycle alternating between a high discharge current and substantially less discharge current. The batteries $430_1$ through $430_1$ should preferably be discharged to a voltage level from the order of $10^{-1}$ vdc. When the batteries $430_1$ through $430_n$ have been discharged, they may then be charged by conventional methods and put into normal use.

Alternative methods of the present invention include the combination of charging several batteries using conventional means and then discharging by the method described above in connection with FIG. 4.

It is to be understood that the above-described embodiments of the invention are merely illustrative. Other implementations may readily be devised by those of ordinary skill in the art which will embody the principles of the invention and fall within the spirit and scope thereof.

I claim:

1. A method of conditioning an electrical storage battery comprising:

applying an alternating charging current to the battery, said alternating charging current comprising a substantial plurality of cycles, said alternating current having a frequency of at least approximately 20 kHz, and wherein each of said cycles alternates between a first charging current and a second charging current, the second charging current being substantially less than the first charging current;

removing the alternating charging current from the battery when the battery is substantially charged; and rapidly discharging said battery.

2. The method of claim 1 wherein the step of rapidly discharging said battery further comprises subjecting the battery to a discharge current comprising a plurality of cycles, each cycle alternating between a first discharge current and a second discharge current, the second discharge current being substantially less than the first discharge current.

3. The method of claim 2 wherein the step of applying a discharge current further comprises applying a discharge current having a waveform exhibiting a frequency of between 20 kHz and 80 kHz.

4. The method of claim 1 wherein the step of applying an alternating charging current further comprises applying an alternating charging current having a waveform exhibiting a frequency of between 20 kHz and 80 kHz.

5. The method of claim 1 wherein the step of applying an alternating charging current further comprises applying an alternating charging circuit having a substantially rectangular waveform.

6. The method of claim 1 wherein the step of applying an alternating charging current further comprises applying an alternating charging current having a frequency of between 20 kHz and 80 kHz and a substantially rectangular waveform, and wherein each cycle consist of less than a 80% duty cycle at the first charging current.

7. The method of claim 1 further comprising the step of monitoring the temperature of the battery relative to a predetermined threshold; and wherein the step of removing the alternating charging current further comprises removing the alternating charging current when the temperature of the battery exceeds the threshold.

8. The method of claim 7 wherein the battery comprises a nickel cadmium cell and the step of removing the alternating charging current further comprises removing the alternating charging current when the temperature of the battery exceeds 38° C.

9. An apparatus for charging an electrical storage battery comprising:

a) a DC power supply;

b) a current regulator connected to said power supply;

c) a socket into which the electrical storage battery may be positioned, the socket connected to said current regulator;

d) a high frequency power switch connected to said power supply and to said socket, the high frequency power switch having an on and off condition; and e) a source of high frequency signals having a frequency of at least approximately 20 kHz coupled to the high frequency power switch, the signal source operable to drive said high frequency power switch to turn said switch on and off at a frequency of at least approximately 20 kHz such that when the switch is turned on, a first charging current flows through the socket and when the switch is turned off, a second charging current flows through the socket, the second charging current being substantially less than the first charging current.

10. The apparatus of claim 9 wherein the source of high frequency signals further comprises a 20 kHz to 80 kHz output signal to drive the high frequency power switch.

11. The apparatus of claim 9 wherein the source of high frequency signals further comprises a 20 kHz to 80 kHz substantially rectangular wave output signal to drive the high frequency power switch.

12. The apparatus of claim 9 further comprising:

a power cutoff device connected between the socket and the DC power supply;

a thermal sensor operably connected to sense the temperature of the battery located within the socket; and a means for controlling the power cutoff device operably connected to the thermal sensor, said controlling means operable to cause the power cutoff device to disconnect the dc power supply from the socket when the temperature of the battery within the socket exceeds a threshold temperature.

13. The apparatus of claim 12 wherein said apparatus is operable to charge a nickel cadmium battery, and the threshold temperature at which the control means causes the power cutoff device to disconnect the dc power supply from the socket comprises approximately 38° Celsius.

14. The apparatus of claim 9 wherein the high frequency power switch comprises a field effect transistor.

15. The apparatus of claim 9 wherein the source of high frequency signals further comprises:

an oscillator circuit having a high frequency, fast rise time output signal, said output signal having a frequency of at least approximately 20 kHz; and a current driver comprising an input and an output, said input connected to the oscillator circuit and said output connected to the high frequency power switch, said current driver operable to switch rapidly on and off the high frequency power switch.

16. The apparatus of claim 9 wherein the source of high frequency signals further comprises a 20 kHz to 80 kHz rectangular wave output signal to drive the high frequency power switch, wherein the portion of the output signal for which the power switch is turned on comprises less than 80% of the signal wave form.

17. The apparatus of claim 15 wherein the current driver comprises a first bipolar junction transistor connected to a second bipolar junction transistor.

18. A method of conditioning an electrical storage battery comprising:

applying an alternating charging current to the battery, said alternating charging current comprising a substantial plurality of cycles, each of said cycles alternating between a first charging current and a second charging current, the second charging current being substantially less than the first charging current;

removing the alternating charging current from the battery when the battery is substantially charged; and switchably connecting a high current discharge load to the battery at a frequency of at least approximately 20 kHz in order to rapidly discharge said battery.

* * * * *